(12) United States Patent
Techer et al.

(10) Patent No.: US 11,787,135 B2
(45) Date of Patent: Oct. 17, 2023

(54) METHOD OF REPAIRING A COMPOSITE BLADE

(71) Applicant: SAFRAN AIRCRAFT ENGINES, Paris (FR)

(72) Inventors: Marc-Emmanuel Jean François Techer, Moissy-Cramayel (FR); Vincent Bernard Serge Most, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 78 days.

(21) Appl. No.: 17/606,416

(22) PCT Filed: Apr. 22, 2020

(86) PCT No.: PCT/FR2020/000145
§ 371 (c)(1),
(2) Date: Oct. 25, 2021

(87) PCT Pub. No.: WO2020/217006
PCT Pub. Date: Oct. 29, 2020

(65) Prior Publication Data
US 2022/0184906 A1   Jun. 16, 2022

(30) Foreign Application Priority Data
Apr. 26, 2019   (FR) ...................................... 1904490

(51) Int. Cl.
*B29C 73/02* (2006.01)
*F01D 5/00* (2006.01)
(Continued)

(52) U.S. Cl.
CPC .............. *B29C 73/02* (2013.01); *B29C 73/24* (2013.01); *F01D 5/005* (2013.01);
(Continued)

(58) Field of Classification Search
CPC ......... B29C 73/02; B29C 73/24; F01D 5/005; B29L 2031/082; F05D 2240/307;
(Continued)

(56) References Cited

U.S. PATENT DOCUMENTS 6,413,051 B1 * 7/2002 Chou ........................ F01D 5/20
416/241 A
8,925,200 B2 * 1/2015 Hasselberg ........ B23K 37/0435
29/889
(Continued)

FOREIGN PATENT DOCUMENTS

DE   10 2016 217 605 A1   3/2018
FR         2931719 A1   12/2009

OTHER PUBLICATIONS

International Patent Application No. PCT/FR2020/000145, International Search Report and Written Opinion dated Aug. 28, 2020, 9 pgs.
(Continued)

*Primary Examiner* — Rick K Chang
(74) *Attorney, Agent, or Firm* — Cozen O'Connor

(57) ABSTRACT

The invention relates to a method of repairing a blade (1) made of composite material, extending in a so-called axial direction (X), the said blade (1) comprising a root (2) and a blade (3), the axial end of which opposite the root (2) comprises an area to be repaired, the said blade (3) comprising an intrados (4) surface and an extrados (5) surface.

17 Claims, 2 Drawing Sheets

(51) Int. Cl.
  *B29C 73/24* (2006.01)
  *B29L 31/08* (2006.01)
(52) U.S. Cl.
  CPC ... *B29L 2031/082* (2013.01); *F05D 2240/307* (2013.01); *F05D 2300/603* (2013.01)
(58) Field of Classification Search
  CPC .... F05D 2300/603; F02C 3/04; F04D 29/023; F04D 29/26
  See application file for complete search history.

(56) References Cited

U.S. PATENT DOCUMENTS

2001/0054473 A1* 12/2001 Chou ................... B29C 73/025
  156/94
2012/0163981 A1    6/2012 Hong

OTHER PUBLICATIONS

French Application No. FR1904490 Search Report dated Jan. 7, 2020, 9 pages.

\* cited by examiner

Fig. 3
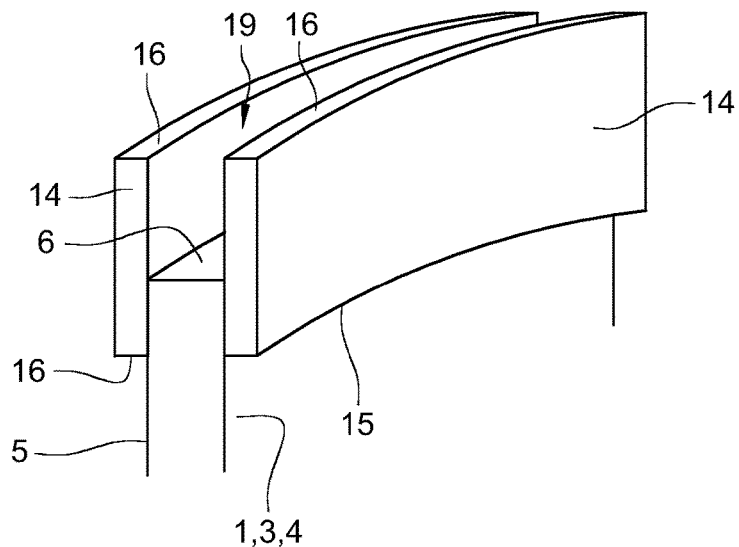
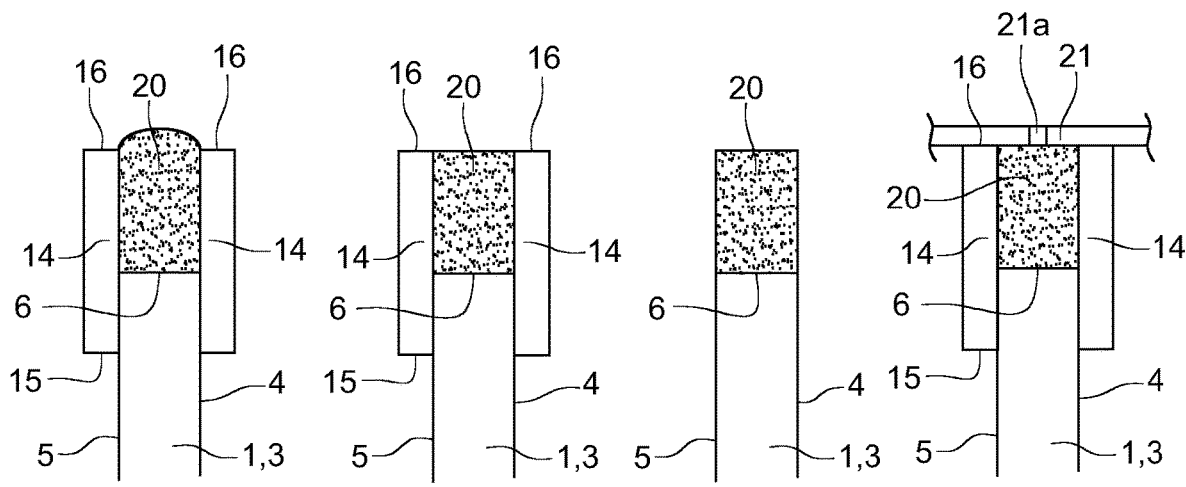
Fig. 4   Fig. 5   Fig. 6   Fig. 7

METHOD OF REPAIRING A COMPOSITE BLADE

CROSS-REFERENCE TO RELATED APPLICATIONS

This application is a 35 U.S.C. § 371 filing of International Application No. PCT/FR2020/000145 filed Apr. 22, 2020, which claims the benefit of priority to French Patent Application No. 19044903 filed Apr. 26, 2019, each of which is incorporated herein by reference in its entirety.

TECHNICAL FIELD OF THE INVENTION

The present invention relates to a method of repairing a turbomachine blade, in particular a composite material blade.

DISCLOSURE OF THE INVENTION

A turbomachine fan typically comprises a rotor comprising blades, for example made of composite material, surrounded by a fan casing comprising an inner wall comprising an abradable material intended to cooperate with the outer ends or tips of the blades.

If friction occurs between the blade tips and the abradable material, there is a risk of damage to the blade tips, especially when the blades are made of composite material. Such damage creates a clearance between the aforementioned vertices and the fan case, which adversely affects the performance of the turbomachine.

In order to avoid such a degradation of performance, it is envisaged to reconstruct the tips of the damaged blades. Very small dimensional tolerances, e.g. of the order of 0.2 mm, are imposed by the specifications in such a reconstruction. One solution is to add resin to the top of the blade and then machine the cured resin to the desired dimension. Such a solution is difficult to implement in the case of composite blades, since the blade tip areas refilled with the resin can have a tendency to break or come off during the operation. machining. Moreover, such a process requires the use of expensive machining centres.

SUMMARY OF THE INVENTION

The invention aims to remedy such drawbacks in a simple, reliable and inexpensive way. To this end, the present invention relates to a method of repairing a blade made of composite material, extending in a so-called axial direction, the said blade comprising a root and a blade, the axial end of which, opposite the root, comprises an area to be repaired, the said blade comprising an intrados surface and an extrados surface, characterized in that it comprises the steps consisting in:
a) positioning the blade in a tooling,
b) positioning at least a first foil and at least a second foil, at the level of the end area to be repaired, respectively on the intrados surface and on the extrados surface of the blade, each foil comprising an axial end opposite the root extending axially beyond the corresponding end of the blade and positioned with respect to a reference of the tooling, said end of each foil defining the axial end of the area to be repaired, said foils defining between them a refill volume,
c) filling the refill volume with a pasty or fluid refill material, such as an uncured resin or a composite refill paste, so that the refill material does not extend beyond the refill volume,
d) hardening the refill material by baking or curing said material,
e) removing the foils.

In this way, the axial dimension of the area refilled with the refill material is imposed by the foils that define the refill volume. There is therefore no need to perform a machining operation after hardening of the hardening material, which avoids the risk of damage to the refilled area as well as the use of a machining centre.

The tooling can comprise bearing surfaces forming reference surfaces and cooperating with the blade root so as to position the said blade axially in the tooling, the tooling further comprising a stop capable of coming to bear on the blade root or the blade, so as to position the said blade in the tooling in a direction perpendicular to the axial direction.

The stop is, for example, able to rest on a trailing edge of the blade.

The blade root may be held in abutment with said bearing surfaces of the tooling and said tooling stop by locking means. The locking means can comprise a fastener.

The blade root can have a dovetail shape.

Step (c) can be performed while the blade is mounted in the tooling.

In step (b), said foils can be secured in position on the blade, the assembly formed by said blade and foils then being removed from the tooling prior to step (c).

The foils can be fixed to the blade, in particular to the blade, by means of locking devices, such as at least one clamp.

In step (b), the foils can be positioned axially with respect to a reference surface of the tooling.

Said reference surface can simulate the surface of the abradable material of a fan case of a turbomachine, for example.

In step (c), excess refill material extending beyond the refill volume can be removed by trimming or scraping.

The shaving or scraping tool can comprise a flexible portion, for example of silicone, applied against the axial ends of the foils so as to remove excess refill material. The shaving or scraping operation is not a machining operation, such an operation being permitted by the fluid or pasty nature of the refill material at this step.

The refill material can be inserted into the refill volume with a spatula.

The corresponding end of the blade, the reference surface and the foils delimit the closed refill volume, the material being inserted into said closed volume in step (c), so as to fill it completely. Such a process does not require a trimming or scraping step before hardening of the refill material, the dimensions of the closed refill volume corresponding to the desired dimensions.

The refill material can be injected into the refill volume using a syringe.

The refill material can be a thermosetting resin.

The resin is for example an epoxy or polyurethane based resin. For example, the resin is filled with short reinforcing fibres, such as glass fibres, which are less than 3 mm long. Alternatively, the resin can be filled with glass beads having a diameter of between 50 and 100 microns.

For example, the resin has a shrinkage of less than 2%.

A closing wall can cover said ends of the foils so as to close the refill volume, the refill material being inserted or injected into said refill volume, e.g. through an orifice or opening.

The invention will be better understood and other details, characteristics and advantages of the invention will appear when reading the following description, which is given as a non-limiting example, with reference to the attached drawings.

BRIEF DESCRIPTION OF THE FIGURES

FIG. 3 is a schematic perspective view of the blade tip and foils;

FIGS. 4 to 6 are schematic views of the blade tip, illustrating various successive steps in the method;

FIG. 7 is a schematic view of the blade tip, illustrating another embodiment of the invention.

DETAILED DESCRIPTION OF THE INVENTION

A method for repairing a composite fan blade 1 for a turbomachine, according to one embodiment, is illustrated schematically in FIGS. 1 to 6.

Figure 2:
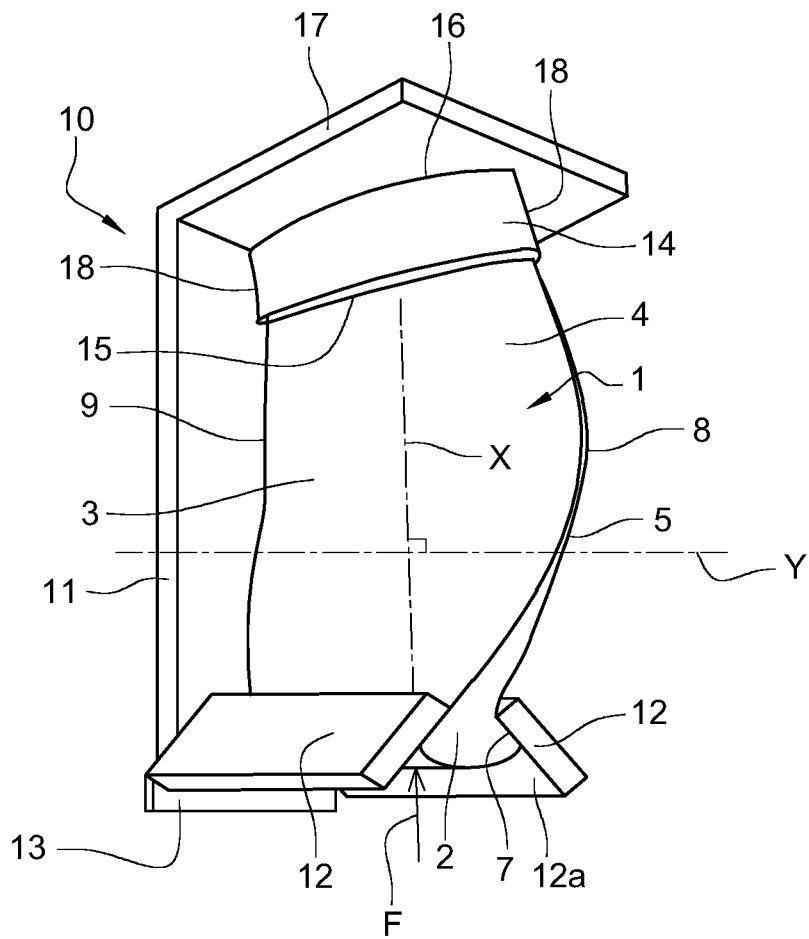
FIG. 2 is a schematic perspective view of a blade mounted in the tooling.

The blade 1 extends along an axis X and comprises a dovetail-shaped blade root 2, located at the bottom in FIG. 2, and a profiled blade 3, comprising an intrados 4 surface and an extrados 5 surface. The blade 3 has a first axial end, connected to the blade root 2, and a second axial end, also referred to as the tip 6 (FIG. 3), opposite the first end. The root 2 has two inclined surfaces 7 facing the tip 6 of the blade, forming bearing surfaces for co-operation with complementary surfaces of a rotor disc of the fan.

The intrados 4 surface and extrados 5 surface meet at a leading edge 8 and a trailing edge 9.

The leading edge 8 is intended to be located upstream of the trailing edge 9, relative to the direction of airflow through the fan.

The blade 1 is made of a composite material comprising for example a fibrous fabric embedded in a resin matrix.

The objective of the repair process according to the invention is to reconstitute the original geometry of the tip 6 of the blade 1 after damage to said tip 6. The reconstitution, also known as refill, of the tip 6 of the blade 1 must be carried out with the same dimensional tolerances as an original blade 1, for example of the order of 0.2 mm, which requires in particular perfect control of the axial distance between the corresponding end 6 of the blade 3 and the axis of the fan rotor, and therefore the axial distance between the corresponding end 6 of the blade 3 and the bearing surfaces 7 of the blade root 2.

The repair method according to the invention comprises first of all a step (E1) of positioning and locking the blade 1 in a tooling 10.

The tooling 10 comprises a fixed support 11, two support areas 12 and a stop member 13 which are fixed with respect to the support 11.

Each support area 12 comprises an inclined surface 12a intended to form a support or a bearing for the complementary bearing surfaces 7 of the blade root 2, so as to limit the displacement of the blade 1 along the X axis, upwards in FIG. 2.

The downstream end or the end forming the trailing edge 9 of the blade root 2 also comes to bear on the stop member 13 of the tooling 10, so as to ensure the positioning of the blade 1 with respect to the tooling 10 along an axis Y, perpendicular to the axis X.

Locking means, such as a clamp of the claw type, exert an axial force F directed upwards in FIG. 2, so as to hold the bearing surfaces 7 of the blade root 2 on the bearing surfaces 12a of the support areas 12.

The tooling 10 further comprises foils 14 which are placed on either side of the blade apex area 6, i.e. against the intrados 4 surface and extrados 5 surface of the blade 1. The shape of each foil 14 is adapted to the shape of the intrados 4 surface or extrados 5 surface of the blade 1. Each foil 14 has a first axial end 15, facing the blade root 2, and a second axial end 16 opposite. The position of the second axial ends 16 of the foils 14 with respect to the rest of the tooling 10 is controlled, for example by pressing said second ends 16 against a support area 17 of the support 11. In other words, it is possible to control the axial distance between the bearing surfaces 7 and the second ends 16 of the foils 14. The side edges 18 of the foils 14 meet at the trailing edge 9 and the leading edge 8 of the tip 6 of the blade 3.

The damaged tip 6 of the blade 3 and the foils 14 then delimit a volume 19 to be reconstituted.

The foils 14 can be integral with the tooling 10 or can be made integral with the blade 1. In the latter case, the foils 14 can be clamped to the blade tip 6, for example, by any appropriate means, such as clamps.

The blade 1 and the foils 14 can then be removed from the tooling 10.

Figure 1:
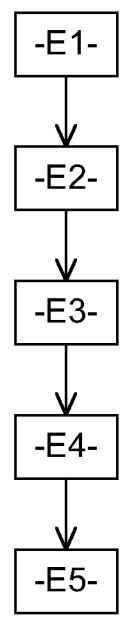
FIG. 1 is a diagram illustrating the different steps of a method for repairing a blade, according to an embodiment of the invention.

The aforementioned volume 19 can then be filled with a pasty or fluid refill material 20 (step E, FIGS. 1 and 4). This material 20 is for example a thermosetting resin, for example an epoxy or polyurethane based resin. For example, the resin is filled with short reinforcing fibres, such as glass fibres, which are less than 3 mm long. Alternatively, the resin can be filled with glass beads having a diameter of between 50 and 100 microns.

Excess thermosetting material 20 can be removed in a shaving or scraping step (step E3, FIGS. 1 and 5) using a tool, for example which can be a flexible silicone tool, so as to avoid any damage to the foils 14. In particular, it is necessary to avoid changing the dimension between the second ends 16 of the foils 14 and the bearing surfaces 7 of the blade root 2.

The refill material 20 is then cured by polymerization, for example in a baking step (step E4, FIG. 1). In this step, the refill material has, for example, a shrinkage of less than 2%. The position of the second ends 16 of the foils 14 can be adjusted to take into account or to anticipate such shrinkage and thus obtain the desired dimension after shrinkage and hardening.

The foils 14 can then be removed (step E5, FIGS. 1 and 6) so as to obtain the repaired blade 1, i.e., the blade 1 whose damaged tip 6 has been reconstituted, reloaded or rebuilt, so as to recover the original dimensions of the blade 1, within the dimensional tolerances.

According to another embodiment illustrated in FIG. 7, a closing wall 21 can cover the second ends 16 of the foils 14 so as to close the volume 19 to be reconstituted. The refill material 20 can be inserted or injected into said volume 19, for example by means of a syringe, through an opening 21a, so as to completely fill said volume 19. The blade 1, the foils 14 and the closing wall 21 can be held in position on the remainder of the tooling 10 during the step of inserting or injecting the refill material 20 into said volume.

Said material 20 can then be cured, for example by baking, and then the reconstituted blade 1 can be removed from the tooling 10.

The invention claimed is:

1. A method of repairing a blade made of composite material, extending in an axial direction (X), said blade comprising a blade root and a profiled blade whose axial end opposite the blade root comprises an area to be repaired, said profiled blade comprising an intrados surface and an extrados surface, the method comprising:
   a) positioning the blade in a tooling,
   b) positioning at least a first foil and at least a second foil, at an apex of the profiled blade to be repaired, respectively on the intrados surface and on the extrados surface of the profiled blade, each foil having an axial end opposite the blade root extending axially beyond the apex of the profiled blade and positioned with respect to a reference of the tooling, said axial end of each foil defining an axial distance between the blade root and an end of the area to be repaired, said foils delimiting between them a refill volume,
   c) filling the refill volume with a pasty or fluid refill material, such as a non-polymeric resin such as an unpolymerized resin or a composite refill paste, so that the refill material does not extend beyond the refill volume,
   d) curing the refill material by baking or polymerizing said material, and
   e) removing the foils.

2. The method according to claim 1, wherein the tooling comprises bearing surfaces forming reference surfaces and cooperating with the blade root so as to position said blade axially in the tooling, the tooling further comprising a stop capable of coming to bear on the blade root or the profiled blade of the blade, so as to position said blade in the tooling in a direction (Y) perpendicular to the axial direction (X).

3. The method according to claim 2, wherein step (c) is performed when the blade is mounted in the tooling.

4. The method according to claim 1, wherein step (c) is performed when the blade is mounted in the tooling.

5. The method according to claim 1, wherein during step (b), the said foils are immobilised in position on the profiled blade, the said profiled blade and the foils then being removed from the tooling before step (c).

6. The method according to claim 1, wherein in step (b) the foils are positioned axially with respect to a reference surface of the tooling.

7. The method according to claim 6, wherein in step (c), excess refill material extending beyond the refill volume is removed by levelling or scraping.

8. The method according to claim 6, wherein the corresponding end of the profiled blade, the reference surface and the foils delimit the refill volume, the material being inserted into the said volume in step (c), so as to fill it completely.

9. The method according to claim 1, wherein the refill material is a thermosetting resin.

10. The method according to claim 1, wherein a closing wall covers said ends of the foils so as to close the refill volume, the refill material being inserted or injected into said refill volume.

11. A method of repairing a blade made of composite material, extending in an axial direction (X), said blade comprising a blade root and a profiled blade whose axial end opposite the blade root comprises an area to be repaired, said profiled blade comprising an intrados surface and an extrados surface, the method comprising:
   a) positioning the blade in a tooling,
   b) positioning at least a first foil and at least a second foil, at an apex of the profiled blade to be repaired, respectively on the intrados surface and on the extrados surface of the profiled blade, each foil having an axial end opposite the blade root extending axially beyond the apex of the profiled blade and positioned with respect to a reference of the tooling, said axial end of each foil defining an axial distance between the blade root and an end of the area to be repaired, said foils delimiting between them a refill volume,
   c) filling the refill volume with a pasty or fluid refill material, such as a non-polymeric resin such as an unpolymerized resin or a composite refill paste, so that the refill material does not extend beyond the refill volume,
   d) curing the refill material by baking or polymerizing said material, and
   e) removing the foils,
   wherein the tooling comprises bearing surfaces forming reference surfaces and cooperating with the blade root so as to position said blade axially in the tooling, the tooling further comprising a stop capable of coming to bear on the blade root or the profiled blade of the blade, so as to position said blade in the tooling in a direction (Y) perpendicular to the axial direction (X).

12. The method according to claim 11, wherein during step (b), the said foils are immobilized in position on the profiled blade, the said profiled blade and the foils then being removed from the tooling before step (c).

13. The method according to claim 11, wherein in step (b) the foils are positioned axially with respect to a reference surface of the tooling.

14. The method according to claim 13, wherein the corresponding end of the profiled blade, the reference surface and the foils delimit the refill volume, the material being inserted into the said volume in step (c), so as to fill it completely.

15. The method according to claim 11, wherein in step (c), excess refill material extending beyond the refill volume is removed by levelling or scraping.

16. The method according to claim 11, wherein the refill material is a thermosetting resin.

17. The method according to claim 11, wherein a closing wall covers said ends of the foils so as to close the refill volume, the refill material being inserted or injected into said refill volume.

* * * * *